United States Patent
Kim et al.

(10) Patent No.: US 8,002,309 B2
(45) Date of Patent: Aug. 23, 2011

(54) AIRBAG APPARATUS FOR VEHICLE

(75) Inventors: Yong Sun Kim, Namyangju-si (KR); Jun Yeol Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 12/479,054

(22) Filed: Jun. 5, 2009

(65) Prior Publication Data
US 2010/0133797 A1  Jun. 3, 2010

(30) Foreign Application Priority Data
Dec. 2, 2008  (KR) .................. 10-2008-0121102

(51) Int. Cl.
*B60R 21/16* (2006.01)
(52) U.S. Cl. .................. 280/729; 280/730.1; 280/743.2
(58) Field of Classification Search ............ 280/743.2, 280/730.1, 743.1, 729
See application file for complete search history.

(56) References Cited

U.S. PATENT DOCUMENTS

| | | | |
|---|---|---|---|
| 2,834,606 A * | 5/1958 | Bertrand | 280/730.1 |
| 6,648,367 B2 * | 11/2003 | Breed et al. | 280/730.1 |
| 6,932,380 B2 * | 8/2005 | Choi | 280/730.1 |
| 7,195,276 B2 * | 3/2007 | Higuchi | 280/730.1 |
| 7,237,798 B2 * | 7/2007 | Mori et al. | 280/730.1 |
| 2010/0225096 A1 * | 9/2010 | Bustos Garcia et al. | 280/730.1 |

* cited by examiner

*Primary Examiner* — Eric Culbreth
(74) *Attorney, Agent, or Firm* — Morgan, Lewis & Bockius LLP

(57) ABSTRACT

An airbag apparatus for a vehicle may include an inflator; a housing installed in a roof, and a cushion contained in the housing and configured to be deployed downwards by a gas discharged from the inflator to protect an occupant in the vehicle, wherein an upper surface of the cushion is supported by the roof when the cushion is in a deployed state, and a front surface of the cushion extends in a rear direction of the vehicle in an inclined shape to form a recess to prevent interference with a seatback of the front seat while the cushion is deployed downwards.

12 Claims, 5 Drawing Sheets

AIRBAG APPARATUS FOR VEHICLE

CROSS-REFERENCE TO RELATED APPLICATIONS

The present application claims priority to Korean Patent Application Number 10-2008-0121102 filed Dec. 2, 2008, the entire contents of which application is incorporated herein for all purpose by this reference.

BACKGROUND OF THE INVENTION

1. Field of the Invention

The present invention relates generally to airbag apparatuses for vehicles and, more particularly, to an airbag apparatus for a vehicle which is installed in a roof and is deployed to protect a rear seat passenger when a vehicle collision occurs.

2. Description of Related Art

Hitherto, development of airbag apparatuses for vehicles has been focused on protecting front seat passengers. The reason for this results from the supposition that when a vehicle collision occurs, the risk of injury to front seat passengers resulting from collision with the steering wheel or the instrument panel is relatively high, but rear seat passengers who are disposed at positions father from the collision spot than the front seat passengers are comparatively safe.

However, when the vehicle is involved in a frontal collision, a rear seat passenger that is not wearing a safety belt may injure his/her head attributable to collision with the head of a front seat passenger or the seat back of the front seat. Taking into account the fact that the percentage of rear seat passengers who wear safety belts is much lower than that of front seat passengers, development of airbag apparatuses for protecting rear seat passengers is more aggressively required.

Meanwhile, in consideration of the above facts, an airbag apparatus of a vehicle for protecting a rear seat passenger was proposed, as shown in FIG. 1. However, in this approach, the airbag apparatus is installed in a seat back 110 of a front seat 100. Hence, a cushion 130 is inflated just in front of the face of a rear seat passenger 200, thus giving a feeling of anxiety to the rear seat passenger. Furthermore, depending on the position of the front seat 100 or an angle at which the seat back 110 is reclined, the direction in which the cushion 130 is deployed varies. To avoid this problem, the forward or backward movement of the front seat 100 or the reclining function of the seat back 110 must be restricted. However, this is not preferable, because it greatly reduces convenience of the front seat 100. In the drawing, the reference numeral 120 denotes a housing which contains the cushion 130 therein.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an airbag apparatus for a vehicle which can solve several problems of the conventional airbag apparatus installed in a seat back of a front seat and more effectively protect a rear seat passenger when the vehicle is involved in a frontal collision.

In an aspect of the present invention the airbag apparatus for a vehicle, may include an inflator, a housing installed in a roof, and a cushion contained in the housing and configured to be deployed downwards by a gas discharged from the inflator to protect an occupant in the vehicle, wherein an upper surface of the cushion is supported by the roof when the cushion is in a deployed state, and a front surface of the cushion extends in a rear direction of the vehicle in an inclined shape to form a recess to prevent interference with a seatback of the front seat while the cushion is deployed downwards, wherein the housing is installed between a front seat and a rear seat, wherein the cushion is shaped of "ㄱ" when the cushion is completely deployed, and wherein the cushion is configured to have locally-different gas pressures therein.

A gas pressure in front upper portion of the cushion may be higher than a gas pressure in a rear lower portion of the cushion and the gas pressure in the rear lower portion of the cushion may be higher than a gas pressure in a rear upper portion thereof, wherein a gas passage through which a gas flows is formed in the cushion so that a gas supplied from the inflator in the front upper portion of the cushion flows along an inner surface of the recess around the rear lower portion of the cushion and then charged into the rear upper portion of the cushion.

The cushion may be partitioned into a plurality of chambers by diaphragms, at least one chamber being disposed in the front upper portion of the cushion, at least one chamber being disposed in the rear lower portion thereof to fluid-communicate with the chambers disposed in the front upper portion of the cushion, and at least one chamber being disposed in the rear upper portion thereof to fluid-communicate with the chambers disposed in the rear lower portion of the cushion, wherein each chamber includes a gas pressure control member so as to control a gas pressure in the respective chamber and wherein the gas pressure control member is at least a gas hole formed on the diaphragm to control flow amount of a gas between adjacent chambers.

At least a vent hole may be formed in the chambers so as to discharge a gas outside the cushion.

In another aspect of the present invention, the chambers may include a first chamber formed between front and rear ends of the upper surface of the cushion and an upper end of the front surface thereof, a second chamber extending along a lower portion of the front surface below the first chamber and along a rear surface of the cushion upwards, and a third chamber disposed between the first chamber and the second chamber in a shape wherein the first chamber and the second chamber substantially surround the third chamber, wherein the first chamber has a shape protruding forwards so that, in the deployed state of the cushion, the first chamber is supported by the roof to withstand force applied to the rear surface of the cushion by the occupant, and wherein, in the deployed state of the cushion, the first chamber is highest in gas pressure and gas pressure in the second chamber is higher than gas pressure in the third chamber.

The diaphragms may include a first diaphragm for partitioning the first chamber and the second chamber, with at least a through hole formed through the first diaphragm so that a gas is drawn from the first chamber into the second chamber through the through hole, a second diaphragm for partitioning the second chamber and the third chamber, and a third diaphragm for partitioning the third chamber and the first chamber, wherein the first diaphragm and the third diaphragm are monolithically integrated with each other and partition the first chamber both from the second chamber and from the third chamber.

A first vent hole may be formed in the second chamber to discharge a gas outside the second chamber therethrough. A second vent hole may be formed in the second diaphragm to discharge a gas in the second chamber into the third chamber wherein a tether is provided between the second diaphragm and the rear surface of the cushion to determine a deployed shape of the second chamber.

In further another aspect of the present invention, the airbag apparatus for a vehicle may include an inflator, a housing installed in a roof between a front seat and a rear seat, a cushion contained in the housing, the cushion being deployed downwards by gas discharged by the inflator to protect a rear seat passenger, and a gas passage configured such that the gas flows along an inner surface of the cushion and then around a rear surface of the cushion that faces the rear seat passenger, and the gas is charged into the cushion in a direction from a lower end to an upper end of the rear surface of the cushion, wherein a front surface of the cushion extends towards the rear surface thereof in an inclined shape and has a recess to prevent interference with a seat back of the front seat while the cushion is being deployed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
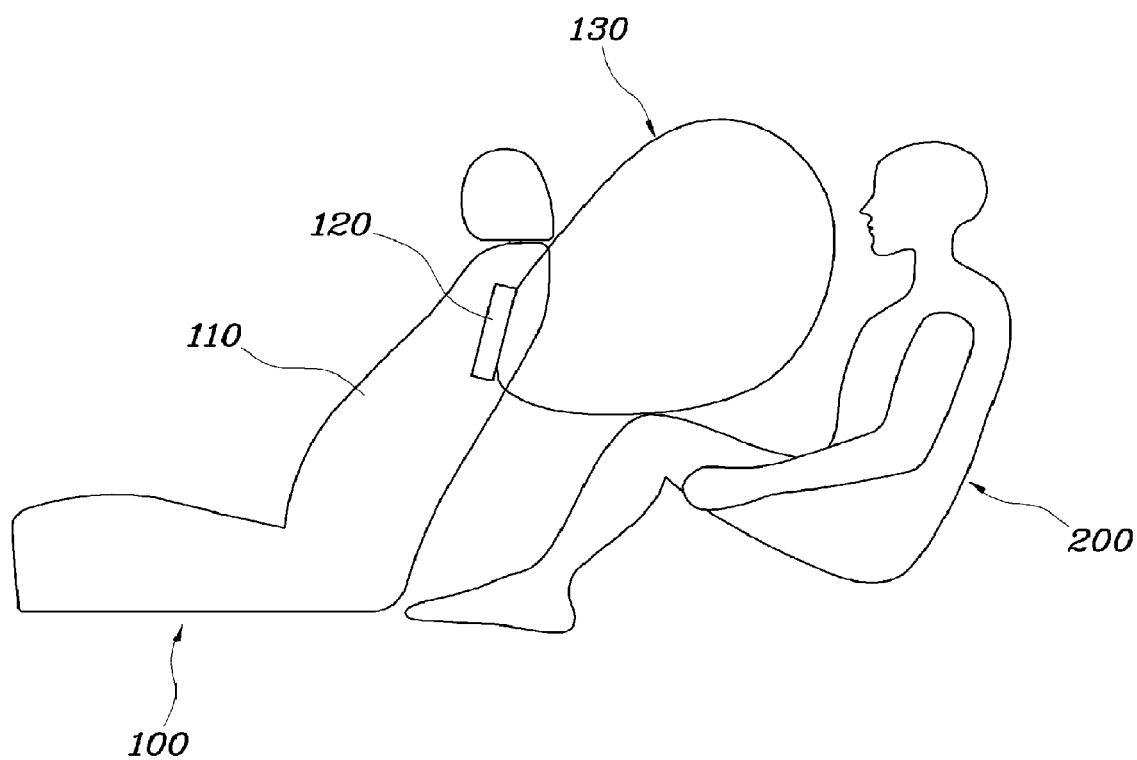
FIG. 1 is a schematic view showing a conventional airbag apparatus of a vehicle which is for protecting a rear seat passenger.
Figure 2:
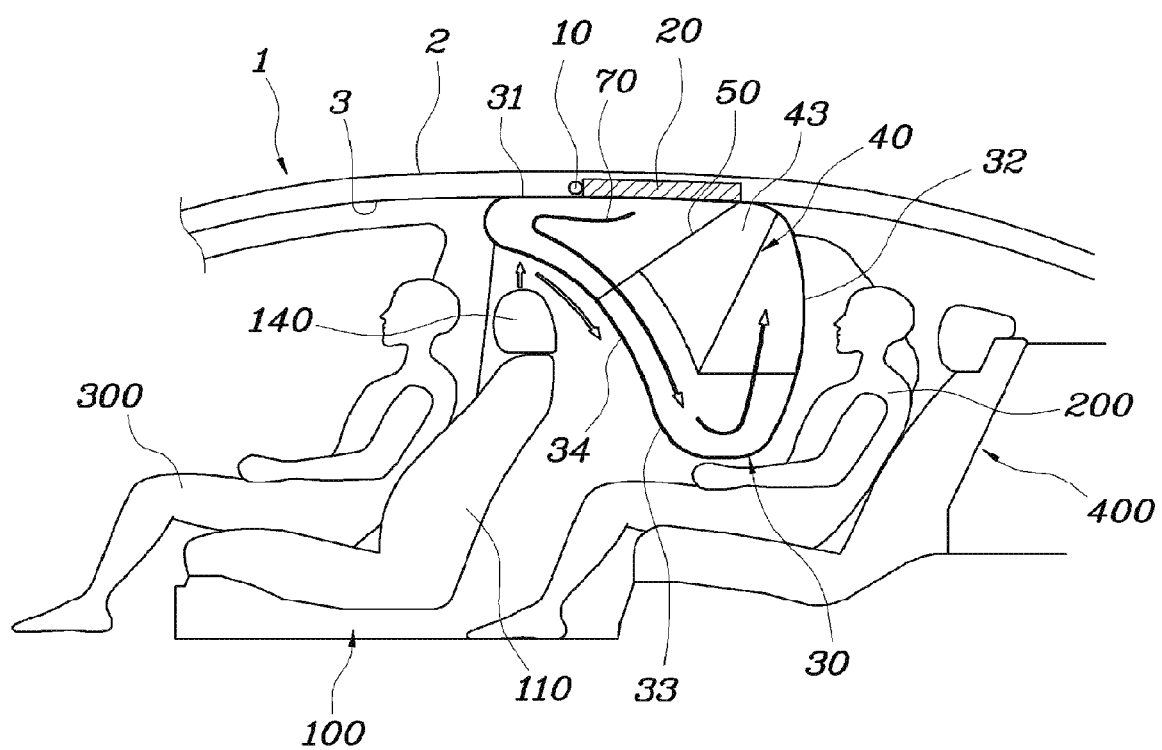
FIG. 2 is a schematic view showing an exemplary airbag apparatus for a vehicle, according to the present invention.

FIG. 2 illustrates deployment of the airbag apparatus according to various embodiments of the present invention. As shown in FIG. 2, a housing 20 is installed in a roof 1 between the front and rear seats. A cushion 30 is inflated and deployed downwards from the housing 20 by gas supplied from an inflator 10, thus protecting a rear seat passenger.

The inflator 10 is preferably installed in a space defined between a roof panel 2 and a head liner 3. A dual stage inflator which discharges gas in two stages is used as the inflator 10. In the first stage, the inflator 10 inflates the cushion 30 within 30 ms. In the second stage, the inflator 10 discharges gas again at the moment at which the rear seat passenger 200 collides with the cushion 30 (from this moment on, reduction in the pressure of the cushion 30 begins), so that the pressure of the cushion 30, in particular, the pressure of a first chamber 41 (see, FIG. 4) is maintained higher than a predetermined value such that a front end of an upper portion of the cushion 30 can be reliably supported by the head liner 3.

The housing 20 is also installed in the space between the roof panel 2 and the head liner 3. The lower surface of the housing 20 may be covered with the head liner 3 or, alternatively, it may be exposed outside the head liner 3, that is, to the passenger compartment. In the former case, a tear line for ensuring deployment of the cushion 30 is formed. In the latter case, an airbag door is provided in the lower surface of the housing 20. Furthermore, the housing 20 must be firmly fixed to the roof 1, because the cushion 30 needs to be reliably suspended by the housing 20 when the cushion 30 is completely deployed.

Figure 3:
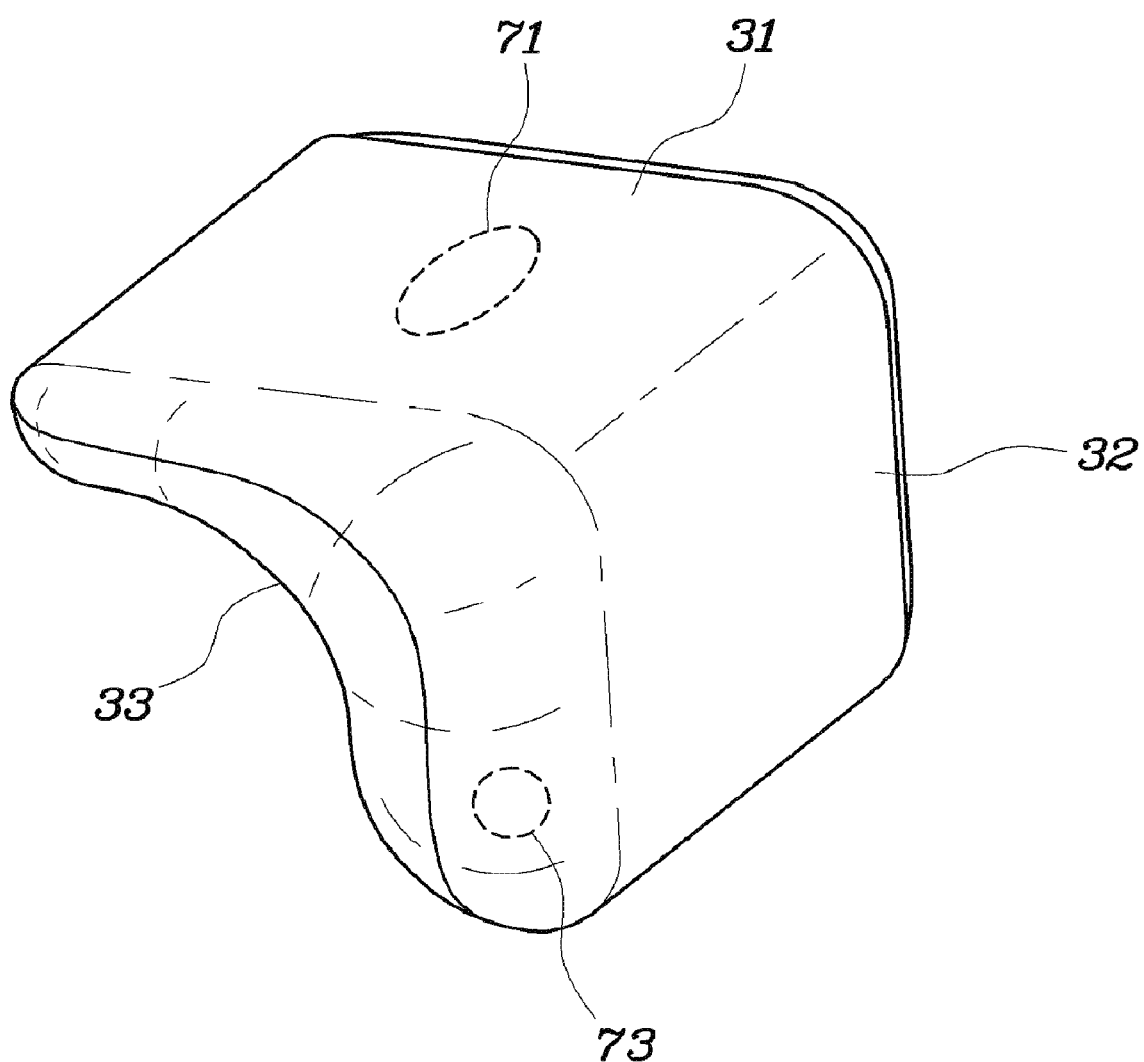
FIG. 3 is a view illustrating the external shape of the cushion shown in FIG. 2.

Referring to FIG. 3 showing the external appearance of the cushion 30 along with FIG. 2, the cushion 30 includes upper, rear and front surfaces 31, 32 and 33 which define therein a closed space 40 for maintaining gas pressure. Here, for the sake of description, the surfaces are distinguished from each other merely depending on the position when the cushion 30 is deployed, but they do not necessarily embody separate fabric pieces which are connected by sewing to form the cushion 30. The closed space 40 includes a plurality of chambers 41, 42 and 43 (see, FIG. 4) which are formed by partitioning the closed space 40 using diaphragms 50, and gas passages 70 through which the chambers 41, 42 and 43 communicate with each other (see, FIGS. 2).

The upper surface 31 is fastened to the housing 20. When the cushion is deployed, a portion of the upper surface 31, other than the portion thereof which is fastened to the housing 20, is extracted to outside the head liner 3. Particularly, when the cushion is deployed, a front portion of the upper surface 31 unfolds forwards and is supported by the head liner 3. Here, it is preferable that the front portion of the upper surface 31 come into surface contact with the head liner 3. Various well-known techniques can be used in the structure for fastening the upper surface 31 to the housing 20.

The rear surface 32 is the portion of the cushion which comes into direct contact with the face or chest of the rear seat passenger 200. The rear surface 32 extends downwards from the rear end of the upper surface 31 in an approximately vertical direction. As such, the reason for the rear surface 32 extending in an approximately vertical direction just ahead of the rear seat passenger 200 is that when the vehicle is involved in a frontal collision, a distance that the rear seat passenger 200 is moved forwards by inertia and an impact applied to the rear seat passenger 200 can be reduced by the rear surface 32. Particularly, in the case of the rear seat passenger 200 who is not wearing the safety belt, the above structure of the rear surface 32 can prevent the rear seat passenger 200 from springing forwards due to impact inertia through the space between a front seat 100 and the head liner 3. More preferably, the lower end of the rear surface 32 extends to the space between the thigh and abdomen of the rear seat passenger 200.

The front surface 33 extends from the front end of the upper surface 31 to the lower end of the rear surface 32 in a curved shape. A recess 34 is formed in the front surface 33 to avoid interference with the front seat 100 when the cushion is deployed. Particularly, the recess 34 has a shape corresponding to a moving trajectory along which a headrest 140 moves when a seat back 110 has been tilted forwards and backwards after the seat back 110 has been moved to the rearmost position and the headrest 140 has been lifted to the uppermost position. The recess 34 having the above shape ensures smooth deployment of the cushion 30 and prevents the cushion 30 which is inflating from striking with great force the face of a front seat passenger 300 who is reclined on the front seat 100 after having tilted the seat back 110 thereof backwards.

The gas passages 70 are formed such that gas discharged from the inflator 10 is charged into the cushion 30 by first flowing towards the front end of the upper surface 31, then flowing downwards along the inner surface of the front surface 34, and finally flowing in the direction from the lower end of the rear surface 32 to the upper end thereof. Because of the above structure of the gas passages 70, first, gas can be first supplied towards the front end of the upper surface 31 such that a force with which the head liner 3 supports the cushion 30 is ensured from the initial stage of the deployment of the cushion 30; secondly, the cushion 30 can be prevented from rapidly inflating in the direction of the rear seat passenger 200, thus preventing the rear seat passenger 200 from being injured by the deployment of the cushion 30.

Meanwhile, in FIG. 2, a portion designated by the reference numeral 43 is empty space (a third chamber which will be explained later). This empty space effectively absorbs impact applied to the rear seat passenger 200 (in particular, the face of the passenger 200) which collides with the rear surface 32. In FIG. 3, a portion designated by the reference numeral 73 is a first vent hole which functions to absorb impact applied to the rear seat passenger 200 by reducing gas pressure in the cushion 30 at the moment when the rear seat passenger 200 collides with the cushion 30. The first vent hole 73 is formed in the second chamber (42: see FIG. 4) which will be explained in detail later. The first vent hole 73 originally is in a closed state and is opened only when the pressure in the second chamber 42 exceeds a predetermined pressure.

Figure 4:
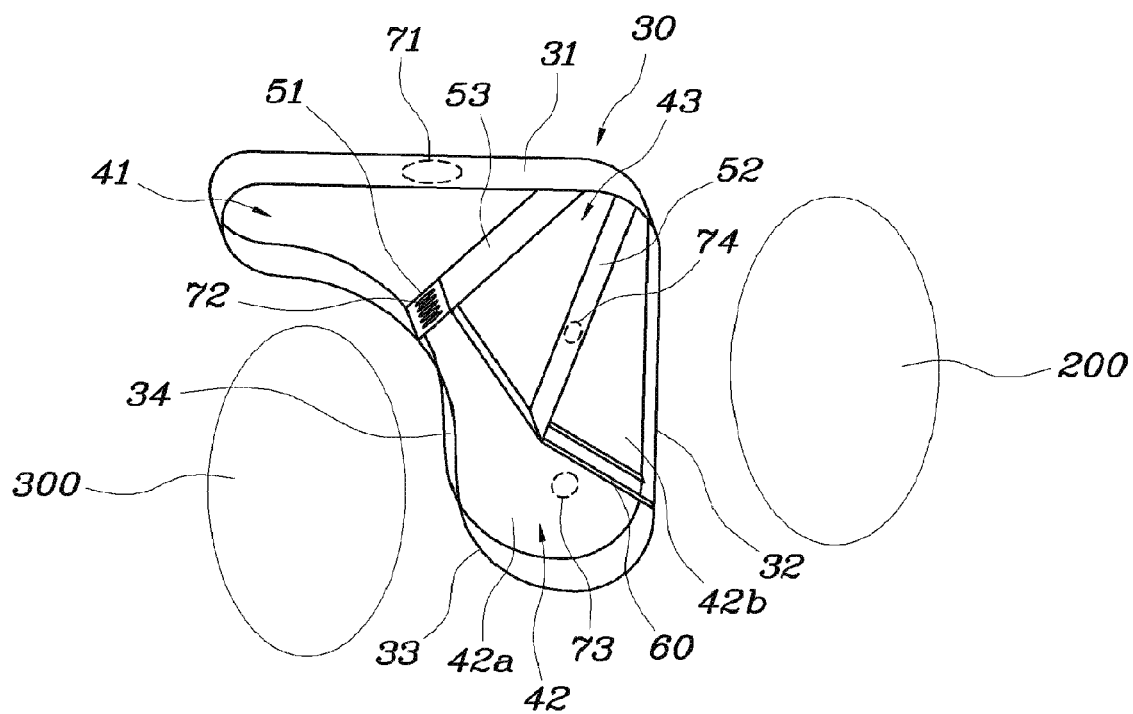
FIG. 4 is a view illustrating the internal construction of the cushion shown in FIG. 2.
Figure 5:
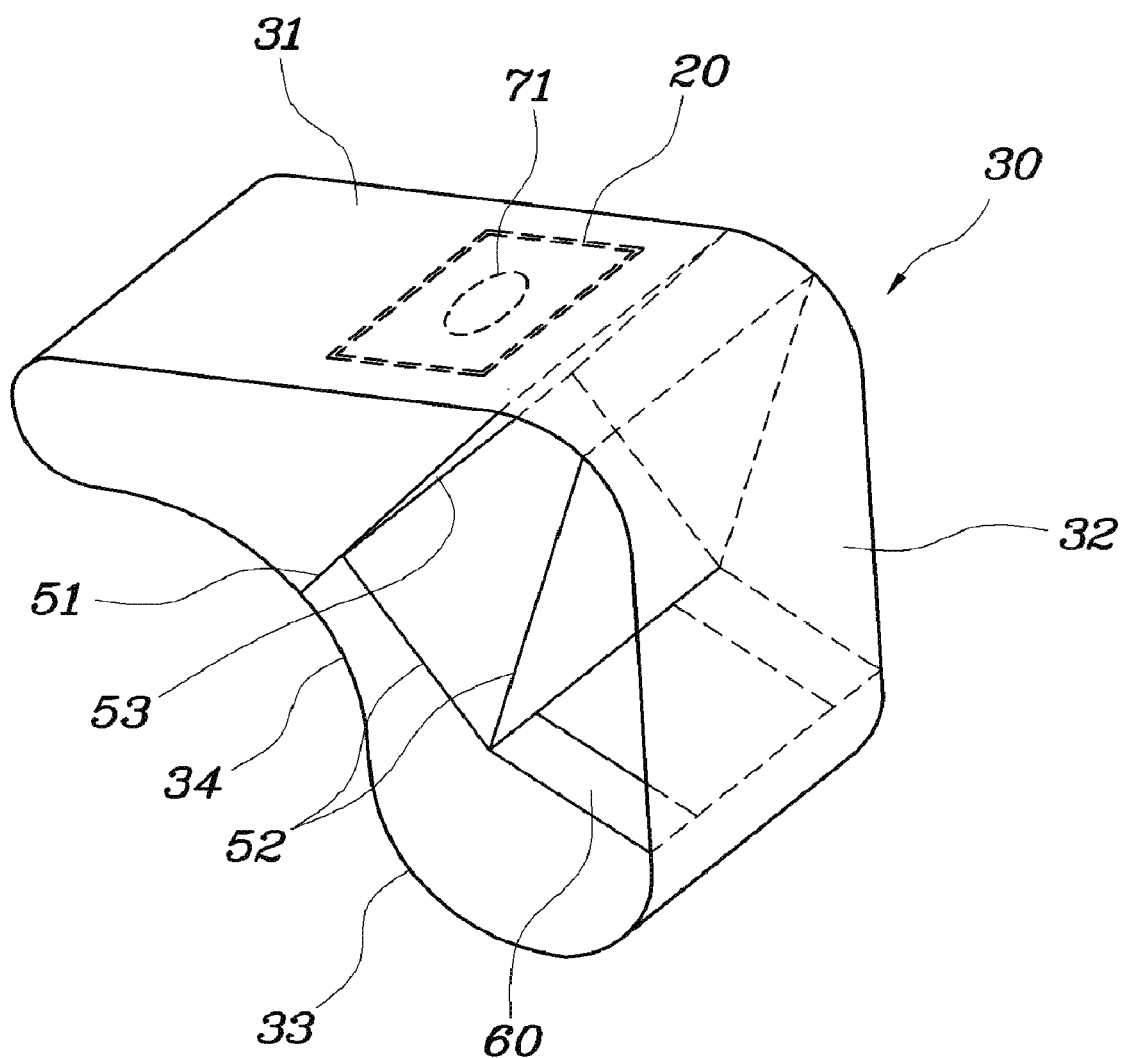
FIG. 5 is another view illustrating the internal construction of the cushion shown in FIG. 2.

The internal construction of the cushion 30 will be described with reference to FIGS. 4 and 5. As shown in FIGS. 4 and 5, the closed space 40 in the cushion 30 is partitioned into the first, second and third chambers 41, 42 and 43 by diaphragms 51, 52 and 53.

The first chamber 41 is disposed between the front and rear ends of the upper surface 31 and the upper end of the front surface 33 and has a shape which protrudes forwards. The first chamber 41 is partitioned off from the second chamber 42 by the first diaphragm 51 and is partitioned off from the third chamber 43 by the third diaphragm 53. The cushion 30 that is completely deployed is supported on the head liner 3 by the first chamber 41. When a vehicle collision occurs, shear force (between the upper surface and the housing) and approximately clockwise force (as shown in FIG. 4) are applied to the cushion 30 by the rear seat passenger 200 that collides with the rear surface 32. At this time, the cushion 30 withstands the clockwise force thanks to the first chamber 41 which is supported by the head liner 3.

The first chamber 41 needs to maintain a relatively high gas pressure to ensure that the first chamber 41 is supported by the head liner 3 with sufficient force. Gas discharged from the inflator 10 is first supplied into the first chamber 41 through a gas hole 71. At least a gas pressure control member such as a through hole 72 may be formed through the first diaphragm 51 to appropriately control the flow of gas from the first chamber 41 into the second chamber 42. According to various embodiments of the present invention, the first diaphragm 51 is integrated with the third diaphragm 53; in other words, they are made of a single piece of fabric. Meanwhile, depending on the case, the inflator 10 may be installed in the cushion 30.

The second chamber 42 extends along the front surface 33 and the rear surface 32 below the first chamber 41. The second chamber 42 is partitioned off from the third chamber 43 by the second diaphragm 52. The second diaphragm 52 is fastened at a first end thereof to a boundary between the first and third diaphragms 51 and 53 and fastened at a second end thereof to the upper end of the rear surface 32 or the rear end of the upper surface 31. A tether 60 which connects the second diaphragm 52 to the rear surface 32 is connected to a medial portion of the second diaphragm 52. The tether 60 functions to determine the deployed shape of the second chamber 42 and the deployed shape of the third chamber 43. Based on the tether 60, the second chamber 42 is divided into a first chamber section 42a which is disposed at the lower position, and a second chamber section 42b which is disposed at the upper position. Gas which is drawn into the first chamber section 42a of the second chamber 42 through the through hole 72 flows upwards in the second chamber section 42b of the second chamber 42.

Furthermore, in various embodiments of the present invention, the first vent hole 73 and/or another gas pressure control member such as a second vent hole 74 for controlling pressure in the second chamber 42 may be formed in the second chamber 42. Gas is discharged to outside of the second chamber 42 through the first vent hole 73, and gas flows through the second vent hole 74 from the second chamber 42 into the third chamber 43 that is empty space.

The third chamber 43 is disposed between the first chamber 41 and the second chamber 42 in a shape in which the first chamber 41 and the second chamber 42 surround the third chamber 3. In the exemplary embodiment, although the second end of the second diaphragm 52 has been illustrated as being connected to the rear surface 32 or the upper surface 31, it may be connected to the third diaphragm 53.

Comparing pressures in the first, second and third chambers 41, 42 and 43 to each other, the pressure in the first chamber 41 is maintained at the highest level. After the first chamber 41, the second chamber 42 is next highest. The pressure in the third chamber 43 is the lowest. In various embodiments of the present invention having the above-mentioned construction, the cushion 30 can be reliably supported by the roof 1 and impart a fluffy feel to the rear seat passenger 200 who collides with the rear surface 32. Meanwhile, in FIG. 5, a portion designated by the reference numeral 20 indicates a position at which the housing containing the cushion 30 is disposed.

As described above, an airbag apparatus for a vehicle according to various embodiments of the present invention may be installed in a roof of the vehicle and thus does not impose restrictions on the design of a front seat.

Furthermore, deployment of a cushion is prevented from being impeded by the front seat, so that the function of protecting a rear seat passenger can be reliably ensured.

As well, when the cushion is deployed it is prevented from striking not only the rear seat passenger but also the face of a front seat passenger.

In addition, the airbag apparatus of the present invention can effectively absorb impact force applied to the rear seat passenger when the vehicle is involved in a frontal collision.

For convenience in explanation and accurate definition in the appended claims, the terms "upper", "downwards", "lower", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag apparatus for a vehicle, comprising:
an inflator;
a housing installed in a roof; and
a cushion contained in the housing and configured to be deployed downwards by a gas discharged from the inflator to protect an occupant in the vehicle;
wherein an upper surface of the cushion is supported by the roof when the cushion is in a deployed state, and a front surface of the cushion extends in a rear direction of the vehicle in an arcuate shape to form a recess to prevent interference with a seatback of the front seat while the cushion is deployed downwards;
wherein the housing is installed between a front seat and a rear seat;
wherein the cushion is ⊓-shaped when the cushion is completely deployed;
wherein the cushion is configured to have locally-different gas pressures therein;
wherein a gas pressure in a front upper portion of the cushion is higher than a gas pressure in a rear lower portion of the cushion and the gas pressure in the rear lower portion of the cushion is higher than a gas pressure in a rear upper portion thereof;
wherein a gas passage through which a gas flows is formed in the cushion so that a gas supplied from the inflator in the front upper portion of the cushion flows along an inner surface of the recess around the rear lower portion of the cushion and then charged into the rear upper portion of the cushion; and
wherein the cushion is partitioned into a plurality of chambers by diaphragms, at least one chamber being disposed in the front upper portion of the cushion, at least one chamber being disposed in the rear lower portion thereof to fluid-communicate with the at least one chamber disposed in the front upper portion of the cushion, and at least one chamber being disposed in the rear upper portion thereof to fluid-communicate with the at least one chamber disposed in the rear lower portion of the cushion.

2. The airbag apparatus as set forth in claim 1, wherein the diaphragms include a gas pressure control member so as to control a gas pressure in the respective chamber.

3. The airbag apparatus as set forth in claim 2, wherein the gas pressure control member is at least a gas hole formed on the diaphragms to control flow amount of a gas between adjacent chambers.

4. The airbag apparatus as set forth in claim 1, wherein at least a vent hole is formed in the chambers so as to discharge a gas outside the cushion.

5. The airbag apparatus as set forth in claim 1, wherein the chambers comprise:
a first chamber formed between front and rear ends of the upper surface of the cushion and an upper end of the front surface thereof;
a second chamber extending along a lower portion of the front surface below the first chamber and along a rear surface of the cushion upwards; and
a third chamber disposed between the first chamber and the second chamber in a shape wherein the first chamber and the second chamber substantially surround the third chamber.

6. The airbag apparatus as set forth in claim 5, wherein the first chamber has a shape protruding forwards so that, in the deployed state of the cushion, the first chamber is supported by the roof to withstand force applied to the rear surface of the cushion by the occupant.

7. The airbag apparatus as set forth in claim 5, wherein, in the deployed state of the cushion, the first chamber is highest in gas pressure and gas pressure in the second chamber is higher than gas pressure in the third chamber.

8. The airbag apparatus as set forth in claim 5, wherein the diaphragms comprise:
a first diaphragm for partitioning the first chamber and the second chamber, with at least a through hole formed through the first diaphragm so that a gas is drawn from the first chamber into the second chamber through the through hole;
a second diaphragm for partitioning the second chamber and the third chamber; and
a third diaphragm for partitioning the third chamber and the first chamber.

9. The airbag apparatus as set forth in claim 8, wherein the first diaphragm and the third diaphragm are integrated with each other and partition the first chamber both from the second chamber and from the third chamber.

10. The airbag apparatus as set forth in claim 8, wherein a tether is provided between the second diaphragm and the rear surface of the cushion to determine a deployed shape of the second chamber.

11. The airbag apparatus as set forth in claim 5, wherein a first vent hole is formed in the second chamber to discharge a gas outside the second chamber therethrough.

12. The airbag apparatus as set forth in claim 5, wherein a second vent hole is formed in the second diaphragm to discharge a gas in the second chamber into the third chamber through.

* * * * *